United States Patent
Yousef et al.

(10) Patent No.: US 11,426,655 B2
(45) Date of Patent: Aug. 30, 2022

(54) METHOD FOR PLAYING ON A PLAYER OF A CLIENT DEVICE A CONTENT STREAMED IN A NETWORK

(71) Applicant: STREAMROOT, Arcueil (FR)

(72) Inventors: Hiba Yousef, Paris (FR); Alexandre Storelli, Lyons (FR)

(73) Assignee: Streamroot, Paris (FR)

( * ) Notice: Subject to any disclaimer, the term of this patent is extended or adjusted under 35 U.S.C. 154(b) by 189 days.

(21) Appl. No.: 16/939,580

(22) Filed: Jul. 27, 2020

(65) Prior Publication Data

US 2021/0268375 A1 Sep. 2, 2021

(30) Foreign Application Priority Data

Feb. 28, 2020 (EP) ..................................... 20305202

(51) Int. Cl.
A63F 13/355 (2014.01)
(52) U.S. Cl.
CPC .................................. A63F 13/355 (2014.09)
(58) Field of Classification Search
CPC . A63F 13/355; H04L 65/4084; H04L 65/607; H04L 65/1069; H04L 65/1093;
(Continued)

(56) References Cited

U.S. PATENT DOCUMENTS

2013/0132525 A1  5/2013  Tippin
2014/0281006 A1* 9/2014  Major ................. H04L 65/1069
                                                            709/231

(Continued)

FOREIGN PATENT DOCUMENTS

FR       3094597 A1    10/2020
WO    2012154287 A2    11/2012
(Continued)

OTHER PUBLICATIONS

International Search Report and Written Opinion of the International Searching Authority, dated May 14, 2021, Int'l Appl. No. PCT/EP21/054477, Int'l Filing Date Feb. 23, 2021; 16 pgs.

(Continued)

*Primary Examiner* — William H McCulloch, Jr.
*Assistant Examiner* — Ankit B. Doshi

(57) ABSTRACT

The present invention relates to a method for playing on a player of a client device (11) a content streamed in a network (1), said content consisting of a sequence of segments available in a plurality of quality levels, the player being configured so as to choose the quality level of the segments as a function of at least one parameter representative of a segment reception rate, according to an Adaptive BitRate, ABR, logic of the player; the client device (11) comprising a first buffer (M1) for storing segments in a format adapted for transferring within the network (1), the method being characterized in that it comprises performing by a processing unit (110) of the client device (11):

(a) receiving from the player a request for a current segment at a first quality level;
(b) estimating, for a second quality level, an optimal response delay such that providing the requested current segment at the expiration of said optimal response delay will cause the player to request according to its ABR logic a next segment at said second quality level, as a function of a model trained from a database of training examples each associating a vector of measured parameters representative of a segment reception rate with the corresponding quality level subsequently chosen by the player according to its ABR logic;
(c) providing the requested current segment from the first buffer memory (M1) at the expiration of said estimated optimal response delay.

14 Claims, 2 Drawing Sheets

(58) Field of Classification Search

CPC ..... H04L 65/60; H04L 65/602; H04L 65/608; H04L 65/80; H04L 67/2814; H04L 67/2823; H04L 67/2842; H04L 67/02; H04N 21/8456; H04N 21/2343; H04N 21/23439; H04N 21/236; H04N 21/2402; H04N 21/2662; H04N 21/436; H04N 21/44004; H04N 21/44227; H04N 21/637; H04N 21/64322; H04N 21/2225; H04N 21/26258; H04N 21/4383

See application file for complete search history.

(56) References Cited

U.S. PATENT DOCUMENTS

| | | |
|---|---|---|
| 2015/0381686 A1 | 12/2015 | Hurst |
| 2017/0026713 A1 | 1/2017 | Yin et al. |
| 2018/0035147 A1* | 2/2018 | DeVreese .......... H04N 21/2662 |
| 2018/0138998 A1 | 5/2018 | Delmas et al. |
| 2020/0036766 A1* | 1/2020 | Mahvash ................ H04L 65/80 |

FOREIGN PATENT DOCUMENTS

| | | |
|---|---|---|
| WO | 2017141001 A1 | 8/2017 |
| WO | WO-2020193754 | 10/2020 |

OTHER PUBLICATIONS

European Search Report for EP Application No. 20305202.2 dated May 12, 2020 (8 pages).

Van Der Hooft et al. "A Learning-Based Algorithm for Improved Bandwidth-Awareness of Adaptive Streaming Clients." IEEE on Integrated Network Management (May 11, 2015), pp. 131-138.

European Search Report for EP Application No. 20315054.5 dated Jun. 8, 2020 (9 pages).

* cited by examiner

METHOD FOR PLAYING ON A PLAYER OF A CLIENT DEVICE A CONTENT STREAMED IN A NETWORK

This application claims benefit of Serial No. 20305202.2, filed 28 Feb. 2020 in Europe and which application is incorporated herein by reference. To the extent appropriate, a claim of priority is made to the above disclosed application.

FIELD OF THE INVENTION

The present invention relates to a method for playing a content streamed for example in a peer-to-peer network.

BACKGROUND OF THE INVENTION

"Streaming" designates a "direct" audio or video stream playing technique, that is while it is recovered from the Internet by a client device. Thus, it is in contrast with downloading, which requires to recover all the data of the audio or video content before being able to play it.

In the case of streaming, storing the content is temporary and partial, since data are continuously downloaded in a buffer of the client (typically the random access memory), analyzed on the fly by its processor and quickly transferred to an output interface (a screen and/or loudspeakers) and then replaced with new data.

Traditionally, the content is provided by a streaming server. The client which desires to access it sends a request to recover first segments therefrom (by segment, it is intended a data block of the content, corresponding generally to a few seconds of playing). When there is sufficient data in the buffer to enable the beginning of the content to be played, playing starts. In the background, the stream downloading continues in order to uninterruptedly supply the buffer with the remaining part of the content.

However, it is noticed that this approach has limits if a great number of clients desire to play the same content simultaneously: the server is found to be saturated, being incapable of providing the content at a sufficient rate for playing to be fluid, and jerks occur.

Recently, an alternative strategy based on "peer-to-peer" (P2P) has been suggested, in which each client acts as a server for other clients: they are called peers. A peer which has started playing the content can forward to others segments it has already received, and so on, hence, easier broadcasting regardless of the number of clients being interested. This strategy is described in the international application WO 2012/154287.

However, most players implement what is known as Adaptive BitRate (ABR) and this proves to be problematic when combined with P2P.

The general idea of the ABR is to allow the automatic variation of the quality of the recovered segments according to the "capacities" of a peer. More precisely, each segment is available at several quality levels corresponding to several bitrates, i.e. data rates. It is indeed to be understood that a segment of better quality has better resolution, less compression, more frames per second, etc., and is consequently larger than the same segment in lower quality, therefore, it is necessary to support a higher data rate.

During ABR streaming, for each segment an algorithm automatically determines according to a given logic (referred to as "ABR logic") the best quality that can be chosen, generally in view of two criteria which are the observed bandwidth and/or the buffer filling rate.

In the first case, if the algorithm judges that the estimated bandwidth is sufficient to support a higher quality, then it will instruct the client to switch to this (or conversely to lower the quality if the bandwidth is too low). In the second case, the principle is to divide the buffer memory into different intervals, each interval corresponding to an increasingly higher quality as the filling of the buffer memory increases (or more and less if it decreases).

In both cases, even if the ABR algorithms have no fundamental incompatibility to be used in a P2P streaming context, the problem is that the ABR algorithms were designed to work in a simple streaming scenario, i.e. with all segments retrieved on request from the content server.

However, in practice P2P streaming advantageously performs "pre-buffering", by downloading P2P segments into a dedicated P2P cache before the reader actually requests them. Indeed, the objective of P2P streaming is to request as little as possible (and as a last resort) the original content server: a direct request from a segment to this server is only made if there is a risk that there are no more segments in the video buffer and that playback is interrupted ("re-buffering"), otherwise there is a maximum count on the P2P network.

We are thus left from the point of view of the player with extremely high apparent bandwidth since segments can be loaded into the buffer memory from the P2P cache a fraction of a second after they have been requested. In addition, the filling rate of the video buffer is artificially high.

This causes the ABR's uncontrolled decisions to increase the quality if the current quality is not the maximum quality, regardless of the actual network capacity, the quality that it may not necessarily be able to support.

To avoid unstable oscillations in the quality of the stream or even repeated interruptions of playing, and numerous and unnecessary requests to the content server, it has been astutely proposed in the application FR1903195 to introduce an artificial response delay before delivering a segment to the player to control the ABR algorithm.

This method is very satisfactory, but choosing the appropriate response delay may be delicate. Too long, on one hand, can starve the player buffer and lead to undesirable rebuffering events. It also makes the ABR falsely believe the available bandwidth is low and switch to lower content qualities. Too short, on the other hand, leads the ABR to switch to excessive qualities that the available bandwidth cannot sustain, resulting in rebuffering events.

The optimal delay is strongly dependent on the implemented ABR logic, so it is very important first to understand this logic (i.e. knowing how the ABR "works") then modifying the response delay accordingly. The problem is that, unfortunately, the ABR logic is often specific to the player and not very accessible, and even less modifiable.

It would, therefore, be desirable to have a more universal, reliable and agnostic way of controlling any ABR algorithm in a P2P streaming context.

The present invention improves the situation.

SUMMARY OF THE INVENTION

For these purposes, the present invention provides according to a first aspect a method for playing on a player of a client device a content streamed in a network, said content consisting of a sequence of segments available in a plurality of quality levels, the player being configured so as to choose the quality level of the segments as a function of at least one parameter representative of a segment reception rate, according to an Adaptive BitRate, ABR, logic of the player;

the client device comprising a first buffer for storing segments in a format adapted for transferring within the network, the method being characterized in that it comprises performing by a processing unit of the client device:

(a) receiving from the player a request for a current segment at a first quality level;

(b) estimating, fora second quality level, an optimal response delay such that providing the requested current segment at the expiration of said optimal response delay will cause the player to request according to its ABR logic a next segment at said second quality level, as a function of a model trained from a database of training examples each associating a vector of measured parameters representative of a segment reception rate with the corresponding quality level subsequently chosen by the player according to its ABR logic;

(c) providing the requested current segment from the first buffer memory (M1) at the expiration of said estimated optimal response delay.

Preferred but non limiting features of the present invention are as it follows:

Said ABR logic is defined by a first function of said at least one parameter representative of a segment reception rate, said model approximating the first function.

The client device further comprises a second buffer for storing segments in a format adapted for being played by the player, said current segment being provided at step (c) to said second buffer.

Said parameter representative of a segment reception rate is a buffer level of the second buffer and/or a bandwidth.

For a given segment, the vector of measured parameters representative of a segment reception rate comprises at least:
the buffer level of the second buffer at which said given segment has been requested by the player
a segment size and/or a segment download time and/or the segment bitrate;
the bandwidth measured for said given segment.

The method comprises a previous step (a0) of training said model from said database of training examples each associating a vector of measured parameters representative of a segment reception rate with the corresponding quality level subsequently chosen by the player according to its ABR logic.

Said model is a linear regression of the first function parametrized by a vector of model parameters, step (a0) comprising determining said vector of model parameters using Ordinary Least Square techniques.

Step (a0) comprises building a training matrix from all the vectors of measured parameters representative of a segment reception rate, and a training vector from all the corresponding quality levels subsequently chosen by the player according to its ABR logic, and determining said training parameters by using a normal equation on the training matrix and the training vector, preferably according to the formula $B=(X^TX)^{-1}X^TY$, wherein X is the training matrix, Y is the training vector, and B is the vector of model parameters.

Step (a0) comprises training, for each a plurality of classes of ABR logic, a model associated to the class.

Step (a0) comprises verifying the plurality of trained models, and selecting one of them as the model properly predicting the ABR logic of the player.

The method comprises a further step (d) of verifying that a request for the next segment at the second quality level is received from the player.

Step (d) comprises, if it is not verified a given number of times that a request for the next segment at the second quality level is received from the player, triggering a new training of the model from said database of training examples.

According to a second aspect, the invention provides a device for playing on a player a content streamed in a network, said content consisting of a sequence of segments available in a plurality of quality levels, the player being configured so as to choose the quality level of the segments as a function of at least one parameter representative of a segment reception rate, according to an Adaptive BitRate, ABR, logic of the player; the client device comprising a first buffer for storing segments in a format adapted for transferring within the network, the client device being characterized in that it comprises a processing unit implementing:

(a) receiving from the player a request for a current segment at a first quality level;

(b) estimating, fora second quality level, an optimal response delay such that providing the requested current segment at the expiration of said optimal response delay will cause the player to request according to its ABR logic a next segment at said second quality level, as a function of a model trained from a database of training examples each associating a vector of measured parameters representative of a segment reception rate with the corresponding quality level subsequently chosen by the player according to its ABR logic;

(c) providing the requested current segment from the first buffer memory at the expiration of said estimated optimal response delay.

According to a third and a fourth aspect the invention provides a computer program product comprising code instructions to execute a method according to the first aspect for playing on a player of a client device a content streamed in a network; and a computer-readable medium, on which is stored a computer program product comprising code instructions for executing a method according to the first aspect for playing on a player of a client device a content streamed in a network.

BRIEF DESCRIPTION OF THE DRAWINGS

The above and other objects, features and advantages of this invention will be apparent in the following detailed description of an illustrative embodiment thereof, which is to be read in connection with the accompanying drawings wherein.

DETAILED DESCRIPTION OF A PREFERRED EMBODIMENT

Architecture

Figure 1:
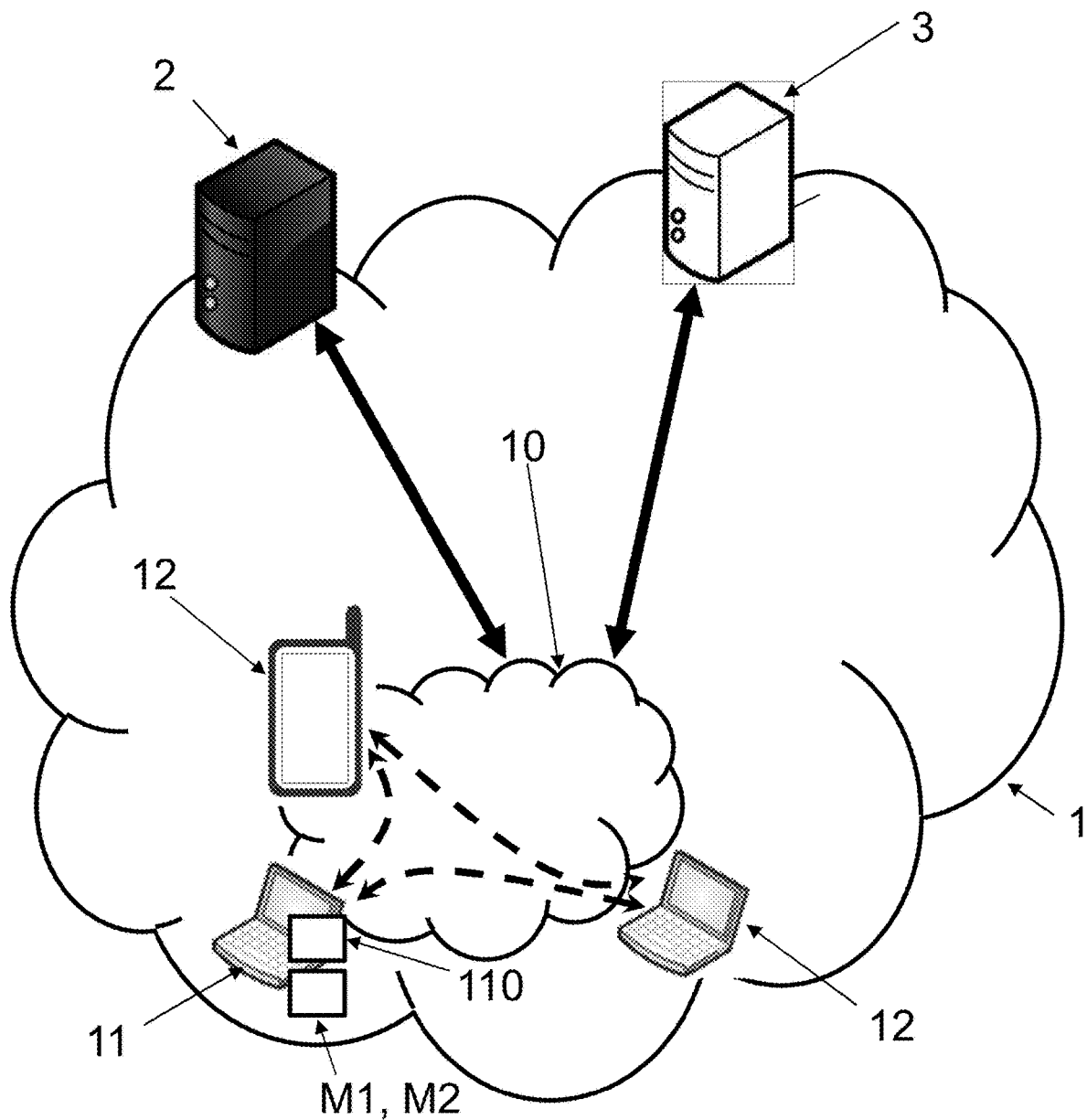
FIG. 1 represents an architecture for implementing the method according to the invention.

In reference to FIG. 1, the invention relates to a method for playing a content streamed within a network 1 (advantageously within a peer-to-peer network 10 of client device 11, 12) using a trained model for predicting the ABR logic of a player of a client device 11, advantageously trained according to a dedicated training method.

The network 1 is herein a large scale telecommunications network and in particular the Internet. This network 1 comprises the peer-to-peer network 10 of client devices 11, 12. Each client device 11, 12 is typically a personal computing device such as a smartphone, a PC, a tablet, etc. connected to the network 1, having a data processing unit 110 such as a processor, an interface for playing the content, and a storage unit such as a random access memory and/or a mass memory.

Playback is implemented by a player, that is to say an application executed by the data processing unit 110, which can be of a varied nature, for example a dedicated application, an internet browser in particular HTML5 compatible, an operating system module, etc. Note that the player may be defined by a name and a version.

We will assume in the following description that the player is "as is", i.e. not modified for the implementation of this process, or even for P2P streaming. In particular, the player implements an adaptive bitrate (ABR) logic, in other words said content to be played consists of a sequence of segments available in a plurality of quality levels and the player is able to decide autonomously which quality level to request, in accordance with this ABR logic. The various quality levels correspond to different bitrates, that is to say a variable volume of data per unit of time (and thus per segment). We naturally understand that better quality content requires a higher bit rate.

More details will follow regarding the concept of ABR logic, it is only to be understood that in the context of the present method it is not necessary that the ABR logic is controllable or even known: the present method is completely universal and can be adapted to any player implementing any ABR logic on the basis of any criteria. It will be assumed that the ABR logic is predefined and that the client software (see below) only undergoes it.

Furthermore, the client device 11 (and more precisely its storage unit) has two buffers M1 and M2, typically two zones of a random access memory, each being able to store (in a different way as will be seen) all or part of the content temporarily (by temporarily, it is meant that the segments are deleted from this memory shortly after they have been played: they are not stored in the long term as is the case for a direct downloading). As will be seen later, in the preferred case of playing via a browser, all the segments are typically deleted (i.e. the buffers are reinitialized) at the latest when the browser or tab in which the video is played is closed.

The first buffer M1 is called "peer-to-peer cache". It stores segments under a so-called "raw" format. By raw segments, it is meant a format adapted for transferring within the network 1, in particular within the peer-to-peer network 10, but not adapted for playing on the device 11.

The second buffer M2 is called "video buffer". It stores segments under a so-called "converted" format. By converted segments, it is meant converted from the raw segments under a format adapted for playing on the device 11, but not adapted for transferring within the peer-to-peer network 10.

As explained in the introductory part, these devices 11, 12 are "peers" (also called "nodes") of the peer-to-peer network 10.

By "client devices 11, 12 of a peer-to-peer network 10", it is meant devices connected in the network 1 by a peer-to-peer network protocol. In other words, the data processing units for each peer implement a particular program (client software, referred to as "peer agent", PA), which can be integrated with the player (for example an extension of a web browser), be a dedicated application, or even be embedded into any other software (for example the operating system of an internet access box, or a multimedia box, i.e. a "Set-top box"), for using the peer-to-peer. The present method is mainly implemented via this client software. In the following description, it will be assumed that the client software is in communication with the player so as to provide it with segments, while operating independently. More precisely, we understand that the role of the player is the playing in itself, i.e. the rendering of the segments, while the role of the client software is simply obtaining the segments for the reader, the client software undergoing the operation of the player, and in particular its ABR logic.

As explained, a peer-to-peer network, or P2P is a decentralized sub-network within the network 1, wherein data can be directly transferred between two client devices 11, 12 of the peer-to-peer network 10, without passing through a central server. Thus, it enables all the client devices 11, 12, to play both the role of client and server. The peers 11, 12 are thus defined as "seeders" (or data suppliers) and/or "leachers" (or data receivers).

Said content, which is in particular an audio or video content, that is a media of some length, consists of a sequence of segments (called a "playlist") stored in data storage means of a server 2 connected to the peer-to-peer network 10. The segments have a predetermined length, typically one or two seconds of the content, but it can range from a fraction of a second to about ten seconds. All the segments of a given content have generally the same length.

The server 2 is a content server, advantageously present in the network 1 and connected to the peer-to-peer network 10. In other words, this is one (or more) server(s) of the Internet network 1 providing the segments of various contents in accordance with a given streaming protocol. For example, the HLS ("HTTP Live Streaming") will be mentioned, in which segments are "ts" files, listed in a "m3u8" playlist file. HLS involves the MPEG2 or the fragmented MP4 format for the content. DASH, Smooth streaming, or HDS streaming protocols will also be mentioned. The raw segments may be shared between peers via a protocol of the WebRTC type.

The server 2 is the primary source of the segments, insofar as initially no peer has the content (before a first transfer of the server 2 to this peer 11, 12). The contents are either at the very beginning stored integrally on the server 2 (case of the VOD previously discussed), or generated in real time (case of the live streaming), and in the latter case, the list of segments making it up dynamically changes over time.

Live streaming proposes to broadcast in real time contents associated with "live" events, for example concerts, meetings, sports events, video games, etc., which are simultaneously happening. With respect to streaming of an already integrally existing content as a film, a live streaming broadcast content is actually generated gradually as the associated event happens. Technically, as in the case of a live event on TV, such a content can only be broadcast with some delay, which the user wishes to be as small as possible. This delay is typically in the order of one minute, but can go down to about twenty seconds. Thereby, a playlist of only a few segments (at most some tens) is available at each instant, the segments of this list being dynamically renewed in accordance with a turnover: as the event happens, new segments are created, "age", are received and played by clients (at the end of the expected delay), and finally exit the list.

In the latter case (live streaming), the content should rather be seen as a continuous stream. The sequence of segments is thereby dynamic, that is it is regularly updated. Each time a new segment is generated, it is added at the end of the sequence, and the first segment of the sequence (the oldest) is deleted. All the others are offset according to a turnover mechanism which can be related to a FIFO list. The first segment of the list (the oldest one) can be either "live" or "past" segment. The "live" segment is the segment at the playing edge, and thus, the segments are deleted from the playlist as soon as they are played. The "past" segment exists when the content server 2 accepts that the content is played with some delay e.g. DVR (Digital Video Recorder) and other platforms that allow live streaming with up to a 2*h* delay.

The present method may be implemented in any context.

To the peer-to-peer network 10 is also connected a peer management server 3 called a "tracker". The tracker 3 has data processing means and storage means. It coordinates exchanges between peers 11, 12 (by controlling the client software implemented by each of the client devices 11, 12), but it is not directly involved in data transfer and does not have a copy of the file.

As explained, a dedicated method for training the model for predicting the ABR logic of the player may be implemented, either by the processing unit 110 of a client device 11 (or of another client device 12) or directly by the peer management server 3.

As it will be explained, the equipment performing the training has to store a training database made of data associated to a plurality of training segments already provided to the player (pairs of a vector of parameters representative of a segment reception rate measured when said training segment has been requested to the player and the corresponding quality level subsequently chosen by the player according to its ABR logic).

Note that there may be as many models (and databases) as types and versions of players, and the model for a given player may be learnt by a client device 11, 12 or the server 3, and provided to all the client devices 11, 12 (directly from the server 3, or propagated as P2P messages) for predicting the ABR logic of this particular player at each client device 11, 12. Note that each client device 11, 12 may choose to receive only models corresponding to players it implements (and for example remove the previous model if there is a new version of a given player).

ABR Logic

As already explained, the player of the client device 11 is configured so as to choose the quality level of the segments as a function of at least one parameter representative of a segment reception rate, according to an ABR logic of the player.

In any case, the ABR logic can be defined by means of a first function making it possible to calculate the quality level to be chosen (the bitrate) as a function of said at least one parameter representative of a reception rate of segments. More precisely, said first function is generally called by the player at each segment received, and the output is the quality level at which the next segment will be requested. Note that said output can be expressed in particular as an integer level number (for example between 1 and L, where 1 is the worst quality and L is the best quality or the opposite), or directly as a bitrate value (either a discrete value chosen among a possible bit rate values, or a continuous bitrate value). Said first function is supposed to be a "black box".

It is understood that said parameter representative of a segment reception rate is a monitored parameter, which can be any parameter illustrating the capacity of the device 11 and/or of the network 10 to receive the segments "fast enough". As mentioned, the known ABR logics generally use as a parameter a buffer level of the second buffer memory M2 (either in value, i.e. in seconds or in number of segments, or in rate) and/or a bandwidth (i.e. the data reception rate observed).

In other words, the player monitors the bandwidth and/or the buffer level, and consequently makes decisions as to whether or not to modify the quality level of the segments required.

Note that other parameters are sometimes taken into account, such as device capabilities (including the CPU/GPU load and decoding capabilities, available memory, screen size, etc.) and/or user geographical location.

Thus, there are three main classes of ABR logic:
The "BB" class, for buffer-based ABR logic;
The "RB" class, for rate-based ABR logic;
The "H" class, for hybrid (buffer-rate-based) ABR logic.

Note there might be further classes. The following specification will take the example of these three classes but the skilled person will understand that the present method is not limited to any set of possible ABR logic classes.

Training the Model

The present method proposes to use machine learning (ML) algorithms to train a model predicting the ABR logic, i.e. approximating the above-mentioned first function defining the ABR logic, regardless of the actual class of the ABR logic.

Mathematically, can be built for any given segment (once requested and received by the player) a vector of parameters representative of a segment reception rate measured when said given segment has been requested by the player (i.e. an "input vector") associated to the corresponding quality level subsequently chosen by the player according to its ABR logic (i.e. the "scalar output").

The idea is to include in the input vector any possible parameter representative of a segment reception rate so as to encompass any possible ABR class and logic.

In other words, considering M segments, advantageously successive segments of one or more contents, for each segment $m \in [\![ 1; M ]\!]$ there is an input vector $x^m$ of n features and a scalar output $y^m$, where for example:

$x_1^m = b_m$: the buffer level at which the segment m is requested;
$x_2^m = s_m$: the segment size;
$x_3^m = t_m$: the segment download time;
$x_4^m = bw_m$: the measured bandwidth of segment m;
$x_5^m = bw_{m-1}$: the measured bandwidth for the previous segment.
$x_n^m = bw_{m-n+4}$: the measured bandwidth for the last segments (if existing);
$y^m = [br_m]$: the bitrate decision for the segment m.

The pair of an input vector $x^m$ and the corresponding scalar output $y^m$ is denoted a training example, and a database of training examples may be built for performing a machine learning algorithm so as to train a model. It is to be understood that, as explained, each training example corresponds to the actual reception of a given segment (that can be referred to as training segment) by the player. In other words, each training example associates a vector of parameters representative of a segment reception rate measured when a training segment had been received by the player, and the corresponding quality level subsequently chosen by the player according to its ABR logic for requesting the next segment.

Said model can be defined as the relation between the input and the output, in particular a "hypothesis" $h_\theta$ parameterized with a vector $\theta$ of model parameters such that for each input vector $x^m$ the value $h_\theta(x^m)$ is as close as possible to $y^m$.

Thus, by measuring in real time the current parameters representative of a segment reception rate and generating a current input vector $x^i$, the hypothesis $h_\theta(x^i)$ can be used to predict the output which is the bitrate at which next segment will be requested by the player.

Figure 2:
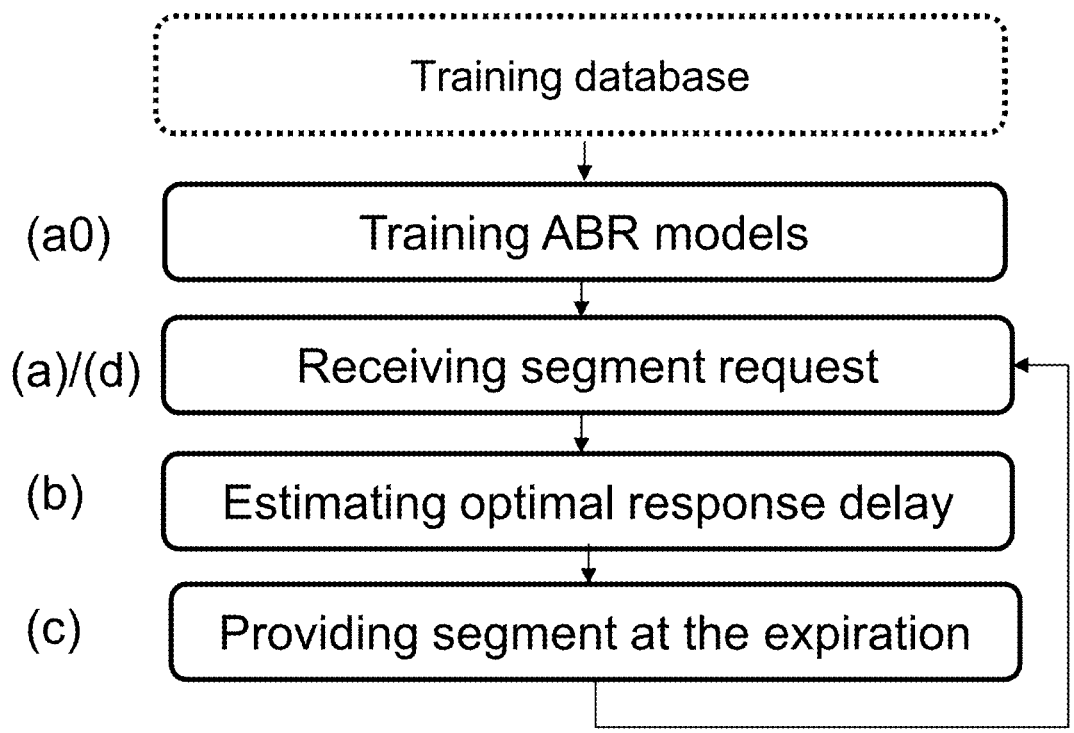
FIG. 2 illustrates a preferred embodiment of the method according to the invention.

Thus, with reference to FIG. 2, the present method advantageously comprises an initial step (a0) of training a model from said database of training examples each associating a vector of measured parameters representative of a segment reception rate (i.e. measured for a given segment, when it had been requested by the player) with the corresponding quality level subsequently chosen by the player according to its ABR logic (when requesting the next segment).

Note that any type of model and any kind of machine learning algorithm may be used.

Preferably, the model is a linear function approximating said first function (linear regression), and it is learnt by linear least square (LLS) techniques, in particular ordinary least squares (OLS) techniques, but the skilled person could use other models (notably polynomial, non-linear, etc.) and other machine learning techniques (Bayesian, k-Nearest Neighbors, Support Vector Machine, etc.).

In the case of linear regression, we have $$h_\theta(x^m) = \theta^T x^m = \theta_0 + \theta_1 x_1^m + \theta_2 x_2^m + \cdots + \theta_n x_n^m, \text{ with } \theta = \begin{bmatrix} \theta_0 \\ \theta_1 \\ \vdots \\ \theta_n \end{bmatrix}.$$

To apply OLS technique, the training database may be expressed as a pair (X,Y) of:

a training matrix X of dimensions (n+1)*M built from all the vectors of measured parameters representative of a segment reception rate, preferably such that:

$$X = \begin{bmatrix} 1 & x_1^1 & x_1^2 & \cdots & x_n^1 \\ 1 & x_2^1 & x_2^2 & & x_n^2 \\ \vdots & & & \ddots & \vdots \\ 1 & x_1^M & x_2^M & \cdots & x_n^M \end{bmatrix}$$

a training vector Y of dimension M built from all the corresponding quality levels subsequently chosen by the player according to its ABR logic, preferably such that:

$$Y = \begin{bmatrix} y^1 \\ y^2 \\ \vdots \\ y^M \end{bmatrix}$$

Note that the "1" in the matrix before each vector $x^m$ allows to have a first offset term $\theta_0$ in the expression of $h_\theta$.

From that, the value of θ can be simply estimated by using the normal equation: $B=(X^T X)^{-1} X^T Y$, where $(X^T X)^{-1} X^T$ is the Moore-Penrose pseudoinverse of X.

As explained, step (a0) may be performed locally by the client 11, or in a centralized way at the server 3. In any case, the training examples may be transmitted within the network 1 for constituting the training database. For example, raw data may be collected from various client 11, 12 at the server 3, wherein processed training data (such as the training matrix X and the training vector Y) is built, and possibly sent back.

ABR Class

The model as previously presented is agnostic and universal, meaning that it can apply to any classes.

However, ABR logics of BB, RB and H classes use different input variables. Therefore, adding more variables (in particular unused or redundant variables) in the training set might result in overfitting the model which makes it strongly depend on the data it is trained for, thus losing the ability to learn accurately.

By knowing the class of the ABR, it is possible to handle this issue by safely removing the redundant features and keeping only the actual inputs of the ABR logic as implemented by the player.

To this end, step (a0) preferentially comprises training a plurality of models (in parallel), one for each class of ABR logic. In our example, there are K=3 classes (BB, RB and H) so that 3 models are trained:

the BB-model is for buffer-based ABR logic. It is trained using only the $x_m^1$ as inputs (the buffer levels of the training examples), i.e.

$$X_1 = \begin{bmatrix} x_1^1 \\ x_1^2 \\ \vdots \\ x_1^M \end{bmatrix}$$

as "simplified" training matrix.

RB-model is for rate-based ABR logic. It is trained using only he $x_m^4, x_m^5, \ldots, x_m^n$ as inputs (the measured bandwidths), i.e.

$$X_{[4,n]} = \begin{bmatrix} x_1^4 & \cdots & x_n^1 \\ \vdots & \ddots & \vdots \\ x_4^M & \cdots & x_n^M \end{bmatrix}$$

as "simplified" training matrix.

H-model is for buffer-rate-based ABR algorithms. It is trained using both buffer levels and bandwidth measurements as inputs (i.e. at least columns 1 and 4 to n of X as training matrix, possibly the whole matrix X). Note that column 2 and 3 may have a special use that will be explained below.

In the preferred embodiment of linear regression using OLS, each model k⊆K may use a normal equation $\theta_k = (X_k^T X_k)^{-1} X^T Y$ (where $X_k$ is the simplified training matrix corresponding to the class, see above) to suggest a different hypothesis $h_{\theta_k}(x)$.

Note that, for a given player, only one of the K models is actually true (i.e. properly predicts the ABR logic of the player). Therefore, step (a0) advantageously further comprises verifying the K models so as to select the appropriate one (the others are discarded) in particular by building a test set (i.e. keeping some pairs $(x^m, y^m)$) to check the categorical accuracy on said test set.

Finally, the selected model might be shared with any device 11, 12 so as to be used at large scale. Propagation of this model amongst peers may be done either from the server 3 of directly by P2P. Note that any peer receiving a model may test it and/or refine it by restarting a new training step (a0).

Controlling the ABR

In the following description, we focus on client device 11 which is trying to retrieve the content from other devices 12 and/or the server 2, that is to say, the first buffer memory M1 already stores at least one raw segment, in at least one quality level, if possible a sub-sequence of the sequence constituting the content.

It is supposed that the model suitable for the player (i.e. predicting the ABR logic of said player) is already trained, selected and available to the device 11.

The method then begins with the implementation by the processing means 110 of the device 11 of a step (a) of receiving a request for a segment (referred to as "current segment"), in practice the next segment to be put in the second buffer memory M2 (not necessarily the next segment to played, there are normally buffered advance segments). Said request is received from the player, and defines the quality level which is required for the requested segment, i.e. the bitrate (by applying ABR logic), referred to as "first quality level".

It is assumed that said segment is at least partially available at this stage (i.e. at least a fragment) in the first buffer M1, in the first quality required by the player. If this segment/segment fragment was in another quality, it would have to be retrieved again, generally directly from the content server 2 because we are running out of time.

Step (a) includes, if necessary, the "measurement" of said at least one parameter representative of a segment reception rate.

In a following step (b), the trained model is used to estimate, for a second quality level (that may be the same as the first quality level), an optimal response delay such that providing the requested current segment at the expiration of said optimal response delay will cause the player to request according to its ABR logic a next segment at said second quality level.

In other words, we intend to control the ABR logic so as to "force" it to request the next segment at the second quality level. By optimal response delay it is meant a response delay suitable for causing the ABR logic to request the second quality level (thus the optimal response delay is not necessarily unique, and generally there is a "range" of optimal response delay). Mathematically, for the next segment m+1, we have to trigger an input vector $x_{m+1}$ such that $\hat{y}_{m+1} = h_\theta(x_{m+1})$ is the second quality level expected to be requested.

To this end, it is first important to understand the relation between the response delay and the input variables of the model: if p is the segment duration (generally fixed) and $d_m$ is the response delay to apply for the current segment m, we have:

$b_{m+1} = b_m + p - d_m$, in other words $x_1^{m+1} = x_1^m + p - d_m$, because the buffer will be gradually emptied by the playing (useful for BB-models and H-models);

$$bw_{m+1} = \frac{s_{m+1}}{t_{m+1}} \approx \frac{s_m}{d_m},$$

in other words $$x_4^{m+1} = \frac{x_2^m}{d_m},$$

because the delay may be translated as download time (the actual transfer time is nearly zero as the segment is already downloaded in the first buffer M1) and $s_m = x_2^m$ is often constant (useful for RB-models and H-models).

Other parameters of the input vector $x_{m+1}$ may be estimated from measurements and parameters of the current vector $x_m$: for example $s_m = x_2^m$ is often constant, and by simple translation $x_{j>4}^{m+1} = x_{j-1}^m$. Consequently, $x_{m+1}$ may be expressed as $f(x_m, d_m)$.

Note that some parameters estimated for calculating $x_m$ might have been estimated from $x_{m-1}$, and their value corrected ($x_1^m = b_m$ can be measured).

To determine the input vector $x_{m+1}$ such that $y_{m+1} = h_\theta(x_{m+1})$, we theoretically have to "reverse" the model.

A first naive way to proceed would be to iteratively try possible values of $d_m$ up to reach a suitable input vector $x_{m+1}$. If a plurality of suitable values of $d_m$ are found, the maximum one is preferably selected as the optimal response delay.

It is to be understood that solving such an optimization problem is within the grasp of a skilled person.

In the preferred case of linear regression, the input is generally a vector of features and the predicted output is a scalar. Using the inverse linear regression could mean two different things:

- either only one combination of all the features that leads to one output is predicted using the formula $x^{m+1} = \theta^{T+} \hat{y}^{m+1}$; where $\theta^{T+}$ is the pseudoinverse of $\theta^T$ (i.e. $\theta^{T+} = (\theta \theta^T)^{-1} \theta$).
- Or only one feature is predicted using the model, the output and the rest of the features, by picking one equation in the following system:

$$x_1^{m+1} = \frac{1}{\theta_1}\left(\hat{y}^{m+1} - \theta_0 - \theta_2 x_2^{m+1} - \cdots - \theta_n x_n^{m+1}\right)$$

$$x_2^{m+1} = \frac{1}{\theta_2}\left(\hat{y}^{m+1} - \theta_0 - \theta_1 x_1^{m+1} - \theta_3 x_3^{m+1} - \cdots - \theta_n x_n^{m+1}\right)$$

$$x_n^{m+1} = \frac{1}{\theta_n}\left(\hat{y}^{m+1} - \theta_0 - \theta_1 x_1^{m+1} - \cdots - \theta_{n-1} x_{n-1}^{m+1}\right)$$

Note that the second approach is very effective since that only two features have generally to be predicted: the desired buffer level ($b_{m+1}$) and the bandwidth ($bw_{m+1}$), because the rest of the features are already known or measured and we cannot control them using response delay.

Note that the system of equations above allows to predict only one feature giving that all the rest features are supposed to be pre-known. This is not necessarily true for hybrid models where a plurality of features is needed to be predicted at the same time. For this specific case the problem can be formulated as the following optimization problem:

$$\text{maximize } d_m$$
$$\text{subject to } \begin{cases} \hat{y}_{m+1} = \theta^T x_{m+1} \\ 0 \leq d_m \leq p \end{cases}$$

Different techniques can be used to solve this problem, like Newton's method, linear programming (LP) or feature construction for inverse reinforcement learning.

At the end of step (b), the optimal response delay is supposed to be estimated.

In the case where it is only a fragment of the requested segment which has been retrieved from the P2P network (it is said that the segment is available in an incomplete manner), preferably the estimated optimal response delay is modified according to the length of the fragment so as to reflect the fact that only a fragment of the optimal response delay should actually be applied. Indeed, the second buffer M2 can only be provided with complete segments and not fragments, and the idea is to provide the segment in full after a shorter response delay reflecting the fact that there will already be an implicit waiting delay corresponding to the time to complete (finish retrieving) this segment in the first buffer M1. Thus, step (b) may include modifying the estimated optimal response delay as a function of an estimated duration necessary to finish retrieving the segment.

For example, we could apply the formula $d_m'=d_m-tdw$, where $d_m'$ is the modified optimal response delay and tdw is the estimated time needed to finish retrieving the segment. So, waiting for time tdw plus applying $d_m'$ before delivering the full segment is equivalent to applying $d_m$, so the overall delay remains the same.

In a step (c), said required segment is provided in response to the request, from the first buffer M1, at the expiration of said estimated optimal response delay. By "provided at the expiration of said response time" is meant so that the player does not have it before the expiration of the optimal response delay (at best at the time of expiration, or even only after in some cases, see below). Most often, the segment is transmitted suddenly when the response delay expires, but it will be understood that it is quite possible to "stream" it within device 11, i.e. to transmit it from the first buffer M1 gradually (piece after piece) so that the last piece is transmitted (at the earliest) when the optimal response delay expires (the optimal response delay is then a "transmission time of the last bit of the segment"). Indeed, although only complete segments are readable, some players can accept sub-segments of the segment. Note that such a progressive transmission does not change anything since as long as the segment is not fully received it is not available by the player and therefore not considered to be provided, but makes it possible to facilitate bandwidth measurements.

In the case where only a fragment of the segment was available in the first buffer M1 and the response time has been modified according to an estimated duration necessary to finish recovering the segment, normally the segment is also supplied to the step (b) at the end of the modified response time. As explained, although the supply can be fragmented, one should not confuse sub-segments of a complete segment (which correspond to consecutive pieces of segment obtained from a completely downloaded segment) and an incomplete segment (in which only certain parts of the data, most often corresponding to disparate pieces, have been downloaded). Only a segment completely available in the first buffer M1 can be provided (progressively if necessary) in response to the request (and not a fragment), so that if the download takes longer than expected, the segment may not be fully available until after the modified response delay has expired. Thus, the complete segment is provided at the earliest at the expiration of the modified optimal response delay (i.e. not before), but possibly after. In practice, the complete segment is provided when the following two conditions are satisfied: the segment is completely available (its download is complete), and the modified optimal response delay has expired.

In all cases, the segment is preferably provided to the second buffer M2, and as such step (c) can comprise the conversion into a format suitable for playing said segment. This consists in transforming the raw segment into a converted segment, which can be read by the player of the device 11, unlike the raw one.

For example, if the player is the built-in player of an HTML5 compatible browser, the conversion consists of injecting the segment's video data using the Media Source Extension API of the browser Naturally, step (c) advantageously comprises simultaneously playing a previous segment stored in the second buffer memory M2, so that the segments need to be renewed. The segment retrieved in step (c) will soon be read in turn.

We can now repeat steps (a) to (c) as long as the playing lasts: the next segment is now the new current segment, and the second quality level is now the new first quality level (because of the application of the optimal response delay which has forced said second quality level as predicted)

In other words, a new occurrence of step (a) consists in receiving from the player a request for the next segment at the second quality level. Again, a new optimal response delay (such that providing the requested next segment at the expiration of said new optimal response delay will cause the player to request according to its ABR logic a next segment at a given third quality level) is estimated then applied, etc.

Note that if the second quality level is different from the first quality level, the segments will now be loaded from the P2P network 10 in accordance with the new quality level required, so that the user will have no discomfort.

Note that the method may include a step (d), at the end of step (c), for verifying the prediction. In other words, it is verified that a request for the next segment at the second quality level is received from the player. This step (d) is typically included in the next occurrence of step (a), wherein the request for the next segment is actually received. Verification simply involves comparing the predicted second quality level with the quality level actually requested for the next segment (by the ABR logic).

If the verification is failed (i.e. the next segment is requested at a quality different the second quality), for instance because the ABR logic of the player has been unknowingly updated, it might be decided to retrain the model, i.e. to perform again step (a0). Note that said retraining may be triggered only in the case of a given number of (preferably consecutive) mispredictions for example (and not a single error). Note that it does not exclude that further conditions could be set for triggering said retraining.

In the case the model had not been trained by the present client device 11 (or just received), the new training may be either done by the client device 11 itself (and the new model be propagated to other peers as explained), or information may be sent to others peers and/or the server 3 for triggering the new training of the model by one of them, and then the propagation of the new model back to the client device 11.

Device and Computer Program Product

According to a second aspect, the invention concerns the device 11 for performing the previous described method for playing a content (streamed in a peer-to-peer network 10 of client devices 11, 12) on a player of the device 11 configured so as to choose the quality level of the segments as a function of at least one parameter representative of a segment reception rate, according to an ABR logic of the player.

This device 11 comprises as explained:
- a first buffer M1 (P2P cache) for storing segments in a format adapted for transferring within the peer-to-peer network 10;
- Preferably a second buffer M2 (video buffer) for storing segments in a format adapted for being played by the player;
- a processing unit 110.

The processing unit 110, typically a processor, is implementing the following steps:

(a) receiving from the player a request for a current segment at a first quality level;

(b) estimating, fora second quality level, an optimal response delay such that providing the requested current segment at the expiration of said optimal response delay will cause the player to request according to its ABR logic a next segment at said second quality level, as a function of a model trained from a database of training examples each associating a vector of measured parameters representative of a segment reception rate with the corresponding quality level subsequently chosen by the player according to its ABR logic;

(c) providing (to the player, in particular by being stored into the second memory M2) the requested current segment from the first buffer memory M1 at the expiration of said estimated optimal response delay.

In a third and fourth aspect, the invention concerns a computer program product comprising code instructions to execute a method (particularly on the data processing unit 110 of the device 11) according to the first aspect of the invention for playing on a player of a client device 11 a content streamed in a peer-to-peer network 10 of client devices 11, 12, and storage means readable by computer equipment (memory of the device 11) provided with this computer program product.

The invention claimed is:

1. A method for playing on a player of a client device a content streamed in a network, said content consisting of a sequence of segments available in a plurality of quality levels, the player being configured so as to choose the quality level of the segments as a function of at least one parameter representative of a segment reception rate, according to an Adaptive BitRate, ABR, logic of the player; the client device comprising a first buffer for storing segments in a format adapted for transferring within the network, the method comprises performing by a processing unit of the client device:

(a0) training said model from said database of training examples each associating a vector of measured parameters representative of a segment reception rate with the corresponding quality level subsequently chosen by the player according to its ABR logic;

(a) receiving from the player a request for a current segment at a first quality level;

(b) estimating, for a second quality level, an optimal response delay such that providing the requested current segment at the expiration of said optimal response delay will cause the player to request according to its ABR logic a next segment at said second quality level, as a function of a model trained from a database of training examples each associating a vector of measured parameters representative of a segment reception rate with the corresponding quality level subsequently chosen by the player according to its ABR logic;

(c) providing the requested current segment from the first buffer memory at the expiration of said estimated optimal response delay.

2. A method according to claim 1, wherein said ABR logic is defined by a first function of said at least one parameter representative of a segment reception rate, said model approximating the first function.

3. A method according to one of claim 1, wherein the client device further comprises a second buffer for storing segments in a format adapted for being played by the player, said current segment being provided at step (c) to said second buffer.

4. A method according to claim 3, wherein said parameter representative of a segment reception rate is a buffer level of the second buffer and/or a bandwidth.

5. A method according to claim 4, wherein, for a given segment, the vector of measured parameters representative of a segment reception rate comprises at least: the buffer level of the second buffer at which said given segment has been requested by the player a segment size and/or a segment download time and/or the segment bitrate; the bandwidth measured for said given segment.

6. A method according to claim 2 in combination, wherein said model is a linear regression of the first function parametrized by a vector of model parameters, step (a0) comprising determining said vector of model parameters using Ordinary Least Square techniques.

7. A method according to claim 6, wherein step (a0) comprises building a training matrix from all the vectors of measured parameters representative of a segment reception rate, and a training vector from all the corresponding quality levels subsequently chosen by the player according to its ABR logic, and determining said training parameters by using a normal equation on the training matrix and the training vector, according to the formula $B=(X^TX)^{-1}X^TY$, wherein X is the training matrix, Y is the training vector, and B is the vector of model parameters.

8. A method according to claim 1, wherein step (a0) comprises training, for each a plurality of classes of ABR logic, a model associated to the class.

9. A method according to claim 8, wherein step (a0) comprises verifying the plurality of trained models, and selecting one of them as the model properly predicting the ABR logic of the player.

10. A method according to claim 1, comprising a further step (d) of verifying that a request for the next segment at the second quality level is received from the player.

11. A method according to claim 10, wherein step (d) comprises, if it is not verified a given number of times that a request for the next segment at the second quality level is received from the player, triggering a new training of the model from said database of training examples.

12. A device for playing on a player a content streamed in a network, said content consisting of a sequence of segments available in a plurality of quality levels, the player being configured so as to choose the quality level of the segments as a function of at least one parameter representative of a segment reception rate, according to an Adaptive BitRate, ABR, logic of the player; the client device comprising a first buffer for storing segments in a format adapted for transferring within the network, the client device comprises a processing unit implementing:

(a0) training said model from said database of training examples each associating a vector of measured parameters representative of a segment reception rate with the corresponding quality level subsequently chosen by the player according to its ABR logic;

(a) receiving from the player a request for a current segment at a first quality level;

(b) estimating, fora second quality level, an optimal response delay such that providing the requested current segment at the expiration of said optimal response delay will cause the player to request according to its ABR logic a next segment at said second quality level, as a function of a model trained from a database of training examples each associating a vector of measured parameters representative of a segment reception rate with the corresponding quality level subsequently chosen by the player according to its ABR logic;

(c) providing the requested current segment from the first buffer memory at the expiration of said estimated optimal response delay.

13. Computer program product comprising code instructions to execute a method according to claim 1 for playing on a player of a client device a content streamed in a network, when said program is executed on a computer.

14. A non-transitory computer-readable medium, on which is stored a computer program product comprising code instructions for executing a method according to claim 1 for playing on a player of a client device a content streamed in a network.

* * * * *